US012706307B2

(12) United States Patent
Park et al.

(10) Patent No.: US 12,706,307 B2
(45) **Date of Patent: *Aug. 11, 2026**

(54) POSITIVE ELECTROLYTE ACTIVE MATERIAL FOR SECONDARY BATTERY, PREPARATION METHOD THEREOF, AND LITHIUM SECONDARY BATTERY INCLUDING SAME

(71) Applicant: LG Energy Solution, Ltd., Seoul (KR)

(72) Inventors: Sang Min Park, Daejeon (KR); Ji Hye Kim, Daejeon (KR); Tae Gu Yoo, Daejeon (KR); Wang Mo Jung, Daejeon (KR); Gi Beom Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/280,832

(22) Filed: Jul. 25, 2025

(65) Prior Publication Data

US 2025/0349846 A1 Nov. 13, 2025

Related U.S. Application Data

(63) Continuation of application No. 18/615,093, filed on Mar. 25, 2024, which is a continuation of application No. 17/279,759, filed as application No. PCT/KR2019/013805 on Oct. 21, 2019, now Pat. No. 12,148,926.

(30) Foreign Application Priority Data

Oct. 26, 2018 (KR) ........................ 10-2018-0129161

(51) Int. Cl.

*H01M 4/525* (2010.01)
*C01G 53/50* (2025.01)
*H01M 4/04* (2006.01)
*H01M 4/505* (2010.01)
*H01M 10/0525* (2010.01)
*H01M 4/02* (2006.01)

(52) U.S. Cl.

CPC ............ *H01M 4/525* (2013.01); *C01G 53/50* (2013.01); *H01M 4/0471* (2013.01); *H01M 4/505* (2013.01); *H01M 10/0525* (2013.01); *H01M 2004/021* (2013.01); *H01M 2004/028* (2013.01)

(58) Field of Classification Search

None

See application file for complete search history.

(56) References Cited

U.S. PATENT DOCUMENTS

2007/0122705 A1 5/2007 Paulsen et al.
2009/0309063 A1 12/2009 Paulsen et al.
2010/0264363 A1 10/2010 Paulsen et al.
2011/0260099 A1 10/2011 Paulsen et al.
2011/0291044 A1 12/2011 Wang et al.
2012/0134914 A1 5/2012 Paulsen et al.
2013/0277604 A1 10/2013 Shimokita et al.
2015/0270545 A1 9/2015 Axelbaum et al.
2015/0280211 A1 10/2015 Kikuya et al.
2016/0006026 A1 1/2016 Paulsen et al.
2016/0099469 A1 4/2016 Paulsen et al.
2016/0301069 A1 10/2016 Kwak et al.
2017/0069907 A1 3/2017 Zhu et al.
2017/0271656 A1 9/2017 Lee et al.
2017/0288222 A1 10/2017 Kobayashi
2017/0317339 A1 11/2017 Shimokita et al.
2019/0027750 A1 1/2019 Park et al.
2019/0036119 A1 1/2019 Lee et al.
2019/0148711 A1 5/2019 Jo et al.
2019/0341598 A1 11/2019 Nam et al.
2020/0036005 A1 1/2020 Jito et al.
2021/0296647 A1 9/2021 Park et al.

FOREIGN PATENT DOCUMENTS

CN 1902776 A 1/2007
CN 101896431 A 11/2010
CN 103456916 A 12/2013
CN 103872328 A 6/2014
CN 104703921 A 6/2015
CN 107004846 A 8/2017
CN 108602689 A 9/2018
CN 108604675 A 9/2018
JP 2010535699 A 11/2010
JP 2012252964 A 12/2012
JP 2017010802 A 1/2017
JP 2017511965 A 4/2017
JP 2018502421 A 1/2018
KR 100772829 B1 11/2007
KR 20140081741 A 7/2014
KR 20170063415 A 6/2017
KR 101791744 B1 10/2017
KR 20180004672 A 1/2018
KR 20180084727 A 7/2018
KR 20180089059 A 8/2018
WO 2014061654 A1 4/2014
WO 2018048085 A1 3/2018
WO 2018179916 A1 10/2018

OTHER PUBLICATIONS

Extended European Search Report for EP 19875260 dated Oct. 14, 2021, 3 pgs.
International Search Report for Application No. PCT/KR2019/013805, dated Jan. 30, 2020, 3 pgs.
Search Report dated Aug. 22, 2023 from the Office Action for Chinese Application No. 201980065005.3 issued Aug. 29, 2023, 4 pages. [See p. 1-3, categorizing the cited references].

*Primary Examiner* — Jonathan Crepeau
(74) *Attorney, Agent, or Firm* — Lerner David LLP

(57) ABSTRACT

A lithium composite transition metal oxide includes nickel (Ni), cobalt (Co), and manganese (Mn), wherein the lithium composite transition metal oxide includes two or more elements selected from the group consisting of Zr, Al, V, Co, and Mg and additional two or more elements selected from the group consisting of Ti, Y, Sr, Nb, Ba, and Ca, and the lithium composite transition metal oxide is in a form of a particle having a crystallite size of 170-300 nm.

15 Claims, No Drawings

POSITIVE ELECTROLYTE ACTIVE MATERIAL FOR SECONDARY BATTERY, PREPARATION METHOD THEREOF, AND LITHIUM SECONDARY BATTERY INCLUDING SAME

CROSS-REFERENCE TO RELATED APPLICATIONS

This application is a continuation of application Ser. No. 18/615,093, filed on Mar. 25, 2024, which is a continuation of application Ser. No. 17/279,759, filed Mar. 25, 2021 and issued as U.S. Pat. No. 12,148,926 on Nov. 19, 2024, which is a national phase entry under 35 U.S.C. § 371 of International Application No. PCT/KR2019/013805, filed Oct. 21, 2019, which claims the benefit of Korean Patent Application No. 10-2018-0129161, filed Oct. 26, 2018, the disclosures of which are incorporated herein in their entirety by reference.

TECHNICAL FIELD

The present invention relates to a positive electrode active material for a secondary battery, a preparation method thereof, and a lithium secondary battery including the same.

BACKGROUND ART

Recently, the demand for a small and lightweight secondary battery having a relatively high capacity is rapidly increased due to the rapid spread of electronic devices using batteries, such as cell phones, notebook computers, electric vehicles, and the like. Particularly, a lithium secondary battery is lightweight and has a high energy density, and thus, is attracting attention as a driving power source for portable devices. Therefore, research and development efforts for improving the performance of a lithium secondary battery have been actively conducted.

A lithium secondary battery generates electric energy by an oxidation and reduction reaction when lithium ions are intercalated/deintercalated from a positive electrode and the a negative electrode when an organic electrolyte or a polymer electrolyte is charged between the positive electrode and the negative electrode made of active materials capable of intercalation and deintercalation of lithium ions.

As a positive electrode active material of a lithium secondary battery, a lithium cobalt oxide ($LiCoO_2$), a lithium nickel oxide ($LiNiO_2$), a lithium manganese oxide ($LiMnO_2$, $LiMn_2O_4$, or the like), a lithium iron phosphate compound ($LiFePO_4$), and the like have been used. Among the above, the lithium cobalt oxide ($LiCoO_2$) has a high driving voltage and excellent capacity properties, and thus, is widely used, and is applied as a positive electrode active material for a high voltage. However, due to the price increase and supply instability of cobalt (Co), the lithium cobalt oxide ($LiCoO_2$) has a limitation in being used as a power source in the field of electric vehicles and the like in a large amount. Therefore, there has been a need for the development of a positive electrode active material which may replace the lithium cobalt oxide ($LiCoO_2$).

As a result, a lithium composite transition metal oxide (hereinafter, simply referred to as an 'NCM-based lithium composite transition metal oxide') in which a part of cobalt (Co) is substituted with nickel (Ni) and manganese (Mn) has been developed. However, a typical NCM-based lithium composition transition metal oxide which has been developed is in the form of secondary particles in which primary particles are aggregated, and thus, has a large specific surface area, low particle strength, a high content of lithium by-products, so that there have been problems in that gas is generated in a large amount and stability is lowered when driving a cell. In particular, in the case of a high-Ni NCM-based lithium composite transition metal oxide in which the content of nickel (Ni) has been increased in order to secure a high capacity, the structural and chemical stability is further deteriorated and securing the thermal stability is even more difficult.

DISCLOSURE OF THE INVENTION

Technical Problem

An aspect of the present invention provides a positive electrode active material of an NCM-based lithium composite transition metal oxide, the positive electrode active material having improved stability. In particular, the present invention is to provide a positive electrode active material of a high Ni NCM-based lithium composite transition metal oxide containing 60 mol % or more of nickel (Ni) in order to secure a high capacity, the positive electrode active material having improved stability.

Specifically, the present invention is to provide a positive electrode active material of an NCM-based lithium composite transition metal oxide in which the specific surface area is reduced, particle strength is improved to suppress particle breakage during roll-pressing, the content of lithium by-products is reduced to reduce side reactions with an electrolyte, and resistance increase is suppressed. Another aspect of the present invention provides a positive electrode active material of an NCM-based lithium composite transition metal oxide capable of reducing the generation of gas when driving a cell and having secured thermal stability.

Technical Solution

According to an aspect of the present invention, there is provided a lithium composite transition metal oxide including nickel (Ni), cobalt (Co), and manganese (Mn), wherein the lithium composite transition metal oxide includes two or more kinds of first dopants selected from the group consisting of Zr, Al, V, Co, and Mg and two or more kinds of second dopants selected from the group consisting of Ti, Y, Sr, Nb, Ba, and Ca, and particles of the lithium composite transition metal oxide has a crystallite size of 170-300 nm.

According to another aspect of the present invention, there is provided a method for preparing a positive electrode active material for a secondary battery, the method including mixing a positive electrode active material precursor including nickel (Ni), cobalt (Co), and manganese (Mn), a lithium raw material, and at least two kinds of first dopant raw materials selected from the group consisting of Zr, Al, V, Co, and Mg, and subjecting the mixture to primary firing, and after the primary firing, mixing at least two kinds of second dopant raw materials selected from the group consisting of Ti, Y, Sr, Nb, Ba, and Ca, and subjecting the mixture to secondary firing, wherein particles of a lithium composite transition metal oxide having a crystallite size of 170-300 nm are formed through the primary firing and the secondary firing.

According to yet another aspect of the present invention, there is provided a positive electrode including the positive electrode active material and a lithium secondary battery including the positive electrode.

Advantageous Effects

According to the present invention, the specific surface area of an NCM-based positive electrode active material is reduced, the particle strength is improved, and the content of lithium by-products is reduced, thereby reducing side reactions with an electrolyte. Accordingly, a lithium secondary battery using the NCM-based positive electrode active material of the present invention may have reduced generation of gas when driving a cell, suppressed resistance increase, and secured thermal stability. Particularly, even the stability in a positive electrode active material of a high Ni NCM-based lithium composite transition metal oxide containing 60 mol % or more of nickel (Ni) in order to secure a high capacity may be improved. The NCM-based positive electrode active material of the present invention is capable of securing excellent stability, and thus may be applied to a high-voltage lithium secondary battery.

MODE FOR CARRYING OUT THE INVENTION

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material for a secondary battery of the present invention is a lithium composite transition metal oxide including nickel (Ni), cobalt (Co), and manganese (Mn), wherein the lithium composite transition metal oxide includes two or more kinds of first dopants selected from the group consisting of Zr, Al, V, Co, and Mg and two or more kinds of second dopants selected from the group consisting of Ti, Y, Sr, Nb, Ba, and Ca, and particles of the lithium composite transition metal oxide has a crystallite size of 170-300 nm.

The positive electrode active material of the present invention is an NCM-based lithium composite transition metal oxide including nickel (Ni), cobalt (Co), and manganese (Mn). The lithium composite transition metal oxide may be a high-Ni NCM-based lithium composite transition metal oxide having a nickel (Ni) content of 60 mol % or greater in the total content of metals excluding lithium (Li). More preferably, the content of nickel (Ni) may be 65 mol % or greater, and even more preferably, 70 mol % or greater. When the content of nickel (Ni) satisfies 60 mol % or greater in the total content of metals excluding lithium (Li) of the lithium composite transition metal oxide, a higher capacity may be secured. Alternatively, the lithium composite transition metal oxide may be a low-Ni NCM-based lithium composite transition metal oxide having a nickel (Ni) content of less than 60 mol % in the total content of metals excluding lithium (Li).

The lithium composite transition metal oxide includes two or more kinds of first dopants selected from the group consisting of Zr, Al, V, Co, and Mg and two or more kinds of second dopants selected from the group consisting of Ti, Y, Sr, Nb, Ba, and Ca. More preferably, the lithium composite transition metal oxide may include a first dopant including Al and Zr and a second dopant including Sr and Ti. By using the first dopant including two or more elements such as Al and Zr and the second dopant including two or more elements such as Sr and Ti, when synthesizing a positive electrode active material, a reaction with a lithium raw material and residual lithium on the surface of the positive electrode active material occurs to promote the reactivity of a lithium source or the growth of grain boundary, so that it may be effective in minimizing the secondary particle interface and reducing the specific surface area of an NCM-based positive electrode active material, and side reactions with the electrolyte is reduced, so that the generation of gas may be reduced when driving a cell, the increase in resistance may be suppressed, and the thermal stability may be improved.

The first dopant may be contained in the total content of 2,000 to 6,000 ppm. More preferably, the first dopant may be contained in 2500-5500 ppm, even more preferably in 3000-5000 ppm. When the first dopant is contained in the above content range, there is an effect of securing structural stability and improving lifespan due to the decrease in lithium diffusion resistance and the stabilization of the internal structure of the positive electrode active material.

The second dopant may be contained in the total content of 500 to 3,000 ppm. More preferably, the second dopant may be contained in 700-2700 ppm, more preferably in 1000-2500 ppm. When the second dopant is contained in the above content range, due to the reactivity decrease caused by the surface-phase modification of the positive electrode active material, side reactions with an electrolyte is reduced, so that there is an effect in that the generation of gas is reduced.

More specifically, the NCM-based lithium composite transition metal oxide according to an embodiment of the present invention may be a lithium composite transition metal oxide represented by Formula 1 below.

[Formula 1]

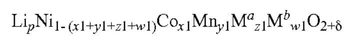

$$Li_pNi_{1-(x1+y1+z1+w1)}Co_{x1}Mn_{y1}M^a_{z1}M^b_{w1}O_{2+\delta}$$

In the above Formula, $M^a$ is at least one element selected from the group consisting of Zr, Al, V, Co, and Mg, $M^b$ is at least one element selected from the group consisting of Ti, Y, Sr, Nb, Ba, and Cam and $1 \leq p \leq 1.5$, $0 < x1 \leq 0.5$, $0 < y1 \leq 0.5$, $0 < z1 \leq 0.025$, $0 < w1 \leq 0.015$, and $-0.1 \leq \delta \leq 1$.

In the lithium composite transition metal oxide of Formula 1 above, Li may be included in an amount corresponding to p, that is, $1 \leq p \leq 1.5$. If p is less than 1, capacity may be deteriorated. If greater than 1.3, the strength of fired positive electrode active material may be increased, making it difficult to perform pulverization and the generation of gas may be increased due to the increase in Li by-products. When considering the effect of improving the capacity properties of the positive electrode active material according to the control of Li content and the balance of sintering in the preparation of the active material, the Li may be included, more preferably, in an amount of $1.0 \leq p \leq 1.3$.

In the lithium composite transition metal oxide of Formula 1 above, Ni may be included in an amount corresponding to $1-(x1+y1+z1+w1)$, for example, $0 < 1-(x1+y1+z1+w1) \leq 0.9$. When the content of Ni in the lithium composite transition metal oxide of Formula 1 above is 0.6 or greater, the amount of Ni sufficient to contribute to charge and discharge may be secured, so that a high capacity may be achieved. More preferably, Ni may be included in an amount of $0.631-(x1+y1+z1+w1) \leq 0.99$.

In the lithium composite transition metal oxide of Formula 1 above, Co may be included in an amount corresponding to x1, that is, $0 < x1 < 0.5$. When the content of Co in the lithium composite transition metal oxide of Formula 1 above is greater than 0.5, costs may be increased. When considering the remarkable effect of improving the capacity properties according to the inclusion of Co, the Co may be included, more specifically, in an amount of $0.05 \leq x1 \leq 0.3$.

In the lithium composite transition metal oxide of Formula 1 above, Mn may be included in an amount corresponding to y1, that is, $0 < y1 \leq 0.5$. Mn may improve the stability of the positive electrode active material, and thus, may improve the stability of a battery. The Mn may be included, more specifically, in an amount of $0.05 \leq y1 \leq 0.3$.

In the lithium composite transition metal oxide of Formula 1 above, $M^a$ may be a first dopant element included in the crystal structure of the lithium composite transition metal oxide, and $M^a$ may be included in an amount corresponding to z1, that is, $0 < z1 \leq 0.025$.

In the lithium composite transition metal oxide of Formula 1 above, $M^b$ may be a second dopant element included in the crystal structure of the lithium composite transition metal oxide, and $M^b$ may be included in an amount corresponding to w1, that is, $0 < w1 \leq 0.015$.

Particles of the lithium composite transition metal oxide of the present invention has a crystallite size of 170 nm to 300 nm. More preferably, the crystallite size thereof may be 180 nm to 280 nm, even more preferably 190 nm to 260 nm. The positive electrode active material satisfying the crystallite size according to an embodiment of the present invention may suppress the particles from being broken which is caused by roll-pressing and the lifespan properties and stability may be improved.

In the present invention, a 'particle' refers to a granule of a micro unit, and a 'primary particle' refers to a granule of the minimum unit in which the boundaries between particles are separated. A 'secondary particle' means an aggregate formed by primary particles being aggregated with each other. When a 'primary particle' is further enlarged, it is possible to identify separated regions in which atoms form a lattice structure in a certain direction, which is called a 'crystallite.' The size of a particle observed in XRD (Bruker D4 Endeavor) is defined as the size of the crystallite. A crystallite size may be measured by using peak broadening of XRD data to estimate the crystallite size, or may be quantitatively calculated using the scherrer equation.

In order to form an NCM-based positive electrode active material satisfying the crystallite size of 170 nm to 300 nm, over-firing may be performed by raising a typical firing temperature of an NCM-based lithium composite transition metal oxide by about 100° C. For example, in the case of a high-Ni NCM-based lithium composite transition metal oxide having a nickel (Ni) content of 60 mol % or greater, a typical firing temperature is about 800-900° C. However, by performing over-firing at a temperature about 100-150° C. higher than that, the crystallite size of an NCM-based positive electrode active material may be increased. In the case of a low-Ni NCM-based lithium composite transition metal oxide having a nickel (Ni) content of less than 60 mol %, a typical firing temperature is about 850-950° C. However, by performing over-firing at a temperature about 100-150° C. higher than that, the crystallite size of an NCM-based positive electrode active material may be increased. Meanwhile, when some dopants are doped in order to improve or stabilize the performance of a positive electrode active material, it may act as a factor which hinders particle growth when compared with a case in which a dopant is not present. Therefore, over-firing at even a higher temperature may be necessary. However, if over-firing is performed at a firing temperature of about 100-150° C. higher as described above, there are problems of lithium (Li) volatilization and the formation of excessive rocksalt phase on the surface of a positive electrode active material, so that capacity is excessively deteriorated and positive electrode active material surface resistance is also increased.

Therefore, in the present invention, preparation is performed such that a first dopant including two or more kinds of elements such as Al and Zr and a second dopant including two or more kinds of elements such as Sr and Ti are contained together, so that the over-firing temperature is lowered to allow the crystallite size of a NCM-based positive electrode active material to satisfy 170 nm to 300 nm. Thus, the positive electrode active material according to the present invention satisfies the crystallite size of an NCM-based positive electrode active material which is 170 nm to 300 nm, and while ensuring the stability, such as the reduction in gas generation and the suppression of resistance increase, problems of capacity deterioration and resistance increase due to over-firing are solved.

In addition, particles of the lithium composite transition metal oxide according to an embodiment of the present invention are etched into a cross-section using a focused ion beam (FIB) device, and when 20 or more secondary particle cross-sections are observed using a scanning electron microscope (FE-SEM), the average number of primary particles in secondary particles on a cross-section is 20 or less. More preferably, the particles of the lithium composite transition metal oxide may have an average number of primary particles in the secondary particles on the cross section of 10 or less, and more preferably 1 to 5 particles.

In the present invention, a 'primary particle' means a primary structural body of a single particle, and a 'secondary particle' means an aggregate in which primary particles are aggregated by physical or chemical bonding between the primary particles without an intentional aggregation or assembly process for primary particles constituting a secondary particle, that is, a secondary structural body.

In the present invention, the average number of primary particles in the secondary particles on the cross section is obtained by etching a positive electrode active material sample into a cross-section using the focused ion beam (FIB) device, and then quantifying the total number of primary particles based on the total number of the secondary particle when observing a cross-section sample for 20 or more secondary particle cross-sections with a scanning electron microscope (FE-SEM).

$$\text{Average number of primary particles} = \text{Total number of primary particles/total number secondary particles}$$

In order to allow the average number of primary particles in the secondary particles on the cross-section of an NCM-based positive electrode active material to satisfy 20 or less over-firing may be performed at a temperature which is about 100° C. higher than a typical firing temperature of an NCM-based lithium composite transition metal oxide. Meanwhile, when some dopants are doped in order to improve or stabilize the performance of a positive electrode active material, it may act as a factor which hinders particle growth when compared with a case in which a dopant is not present. Therefore, over-firing at even a higher temperature may be necessary.

However, if over-firing is performed at a firing temperature of about 100-150° C. higher as described above, there are problems of lithium (Li) volatilization and the formation of excessive rocksalt phase on the surface of a positive electrode active material, so that capacity is excessively deteriorated and positive electrode active material surface resistance is also increased.

Therefore, in the present invention, preparation is performed such that a first dopant including two or more kinds of elements such as Al and Zr and a second dopant including two or more kinds of elements such as Sr and Ti are contained together, so that the over-firing temperature is lowered to allow the average number of primary particles in the secondary particles on the cross-section of a NCM-based positive electrode active material to satisfy 20 or less.

The positive electrode active material according to the present invention satisfies the average number of primary particles in the secondary particles on the cross-section of 20 or less, and thus, may minimize a secondary particle interface and reduce the specific surface area, and improve the particle strength to suppress particle breakage during roll-pressing. In addition, side reactions with an electrolyte are reduced to reduce the generation of gas when driving a cell, and the increase in resistance is suppressed, and the thermal stability may be improved.

In addition, particles of the lithium composite transition metal oxide may have a specific surface area of 0.2-0.7 $m^2/g$. More preferably, the specific surface area thereof may be 0.25 $m^2/g$ to 0.7 $m^2/g$, yet more preferably 0.3 $m^2/g$ to 0.7 $m^2/g$. By satisfying the above specific surface area, the amount of gas generated when driving a cell may be reduced, and since excellent stability is secured even under a high voltage, the application to a high voltage lithium secondary battery is possible.

<Method for Preparing Positive Electrode Active Material>

Next, a method for preparing a positive electrode active material of the present invention will be described.

The method for preparing a positive electrode active material for a secondary battery includes mixing a positive electrode active material precursor including nickel (Ni), cobalt (Co), and manganese (Mn), a lithium raw material and at least two kinds of first dopant raw materials selected from the group consisting of Zr, Al, V, Co, and Mg, and subjecting the mixture to primary firing, and after the primary firing, mixing at least two kinds of second dopant raw materials selected from the group consisting of Ti, Y, Sr, Nb, Ba, and Ca, and subjecting the mixture to secondary firing, wherein particles of a lithium composite transition metal oxide having a crystallite size of 170-300 nm are formed through the primary firing and the secondary firing.

The method for preparing a positive electrode active material will be described in detail step by step below.

First, a positive electrode active material precursor including nickel (Ni), cobalt (Co), and manganese (Mn) is prepared.

The positive electrode active material precursor may be a commercially available positive electrode active material precursor purchased and used, or may be prepared according to a method for preparing a positive electrode active material precursor well known in the art.

For example, the precursor may be prepared by adding a transition metal solution containing a nickel-containing raw material, a cobalt-containing raw material, a manganese-containing raw material with an ammonium cation-containing complex formation agent and a basic compound, and subjecting the mixture to a co-precipitation reaction.

The nickel-containing raw material may be, for example, an acetate, a nitrate, a sulfate, a halide, a sulfide, a hydroxide, an oxide, or an oxyhydroxide, and the like, all containing nickel, specifically $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but is not limited thereto.

The cobalt-containing raw material may be an acetate, a nitrate, a sulfate, a halide, a sulfide, a hydroxide, an oxide, or an oxyhydroxide, and the like, all containing cobalt, specifically $Co(OH)_2$, CoOOH, $Co(OCOCH_3)_2 \cdot 4H_2O$, $Co(NO_3)_2 \cdot 6H_2O$, $CoSO_4$, $Co(SO_4)_2 \cdot 7H_2O$, or a combination thereof, but is not limited thereto.

The manganese-containing raw material may be an acetate, a nitrate, a sulfate, a halide, a sulfide, a hydroxide, an oxide, or an oxyhydroxide, and the like, all containing manganese, specifically a manganese oxide such as $Mn_2O_3$, $MnO_2$, $Mn_3O_4$, and the like, a manganese salt such as $MnCO_3$, $Mn(NO_3)_2$, $MnSO_4$, manganese acetate, dicarboxylic acid manganese salt, citric acid manganese, and fatty acid manganese salt, manganese oxyhydroxide, manganese chloride, or a combination thereof, but is not limited thereto.

The transition metal solution may be prepared by adding a nickel-containing raw material, a cobalt-containing raw material, and a manganese-containing raw material to a solvent, specifically water, or a mixed solvent of water and an organic solvent (for example, alcohol, etc.) which may be uniformly mixed with water. Alternatively, the transition metal solution may be prepared by mixing an aqueous solution of a nickel-containing raw material, an aqueous solution of a cobalt-containing raw material, and an aqueous solution of a manganese-containing raw material.

The ammonium cation-containing complex formation agent may be, for example, $NH_4OH$, $(NH_4)_2SO_4$, $NH_4NO_3$, $NH_4Cl$, $CH_3COONH_4$, $NH_4CO_3$, or a combination thereof, but is not limited thereto. Meanwhile, the ammonium cation-containing complex formation agent may be used in the form of an aqueous solution. At this time, water, or a mixture of an organic solvent which may be uniformly mixed with water (for example, alcohol, etc.) and water may be used as a solvent.

The basic compound may be a hydroxide of an alkali metal or an alkaline earth metal such as NaOH, KOH, or $Ca(OH)_2$, a hydrate thereof, or a combination thereof. The basic compound may also be used in the form of an aqueous solution. At this time, water, or a mixture of an organic solvent which may be uniformly mixed with water (for example, alcohol, etc.) and water may be used as a solvent.

The basic compound is added to control the pH of a reaction solution, and may be added in an amount such that the pH of a metal solution is 11 to 13.

Meanwhile, the co-precipitation reaction may be performed in an inert atmosphere, for example, in a nitrogen atmosphere or in an argon atmosphere, and the like, at a temperature of 40° C. to 70° C.

Through the above process, particles of a nickel-cobalt-manganese hydroxide are generated, and precipitated in a reaction solution. By controlling the concentration of the nickel-containing raw material, the cobalt-containing raw material, and the manganese-containing raw material, a precursor having a nickel (Ni) content of 60 mol % or greater in the total content of metals may be prepared. The precipitated nickel-cobalt-manganese hydroxide particles are separated according to a typical method and dried to obtain a nickel-cobalt-manganese precursor. The precursor may be secondary particles formed by aggregated primary particles.

Next, the precursor, a lithium raw material and at least two kinds of first dopant raw materials selected from the group consisting of Zr, Al, V, Co, and Mg are mixed, followed by primary firing.

The lithium raw material may be a sulfate, a nitrate, an acetate, a carbonate, an oxalate, a citrate, a halide, a hydroxide, or an oxyhydroxide, and the like, all containing lithium, and is not particularly limited as long as it may be dissolved in water. Specifically, the lithium raw material may be $Li_2CO_3$, $LiNO_3$, $LiNO_2$, LiOH, LiOH. $H_2O$, LiH, LiF, LiCl, LiBr, LiI, $CH_3COOLi$, $Li_2O$, $Li_2SO_4$, $CH_3COOLi$, $Li_3C_6H_5O_7$, or the like, and any one thereof or a mixture of two or more thereof may be used.

The first dopant raw material may be a sulfate, a nitrate, an acetate, a carbonate, an oxalate, a citrate, a halide, a hydroxide, or an oxyhydroxide, and the like, all containing a first dopant element. The first dopant raw material may be mixed such that the first dopant is contained in the total content of 2,000-6,000 ppm based on the total weight of the positive electrode active material, more preferably 2,500-5,000 ppm, and even more preferably 3,000-5,000 ppm.

In the case of a high-Ni NCM-based lithium composite transition metal oxide having a nickel (Ni) content of 60 mol % or greater, the primary firing may be performed at 800-1,000° C., more preferably 830-980° C., and even more preferably 850-950° C. In the case of a low-Ni NCM-based lithium composite transition metal oxide having a nickel (Ni) content of less than 60 mol %, the primary firing may be performed at 900-1,100° C., more preferably 930-1,070° C., and even more preferably 950-1,050° C.

The primary firing may be performed in an air or oxygen atmosphere, and may be performed for 15-35 hours.

Next, after the primary firing, at least two kinds of second dopant raw materials selected from the group consisting of Ti, Y, Sr, Nb, Ba, and Ca are mixed, followed by secondary firing.

The second dopant raw material may be a sulfate, a nitrate, an acetate, a carbonate, an oxalate, a citrate, a halide, a hydroxide, or an oxyhydroxide, and the like, all containing a second dopant element. The second dopant raw material may be mixed such that the second dopant is contained in the total content of 500-3,000 ppm based on the total weight of the positive electrode active material, more preferably 700-2,700 ppm, and even more preferably 1,000-2,500 ppm.

In the case of a high-Ni NCM-based lithium composite transition metal oxide having a nickel (Ni) content of 60 mol % or greater, the secondary firing may be performed at 600-950° C., more preferably 650-930° C., and even more preferably 700-900° C. In the case of a low-Ni NCM-based lithium composite transition metal oxide having a nickel (Ni) content of less than 60 mol %, the secondary firing may be performed at 700-1,050° C., more preferably 750-1,000° C., and even more preferably 800-950° C.

The secondary firing may be performed in an air or oxygen atmosphere, and may be performed for 15-35 hours.

Through the primary firing and the secondary firing, particles of a lithium composite transition metal oxide are formed to have a crystallite size of 170 nm to 300 nm. The firing may be performed such that the crystallite size is more preferably 180 nm to 280 nm, even more preferably 190 nm to 260 nm.

In addition, through the primary firing and the secondary firing, a positive electrode active material having the average number of primary particles of 20 or less in secondary particles on a cross-section may be formed. More preferably, a positive electrode active material having the average number of primary particles of 10 or less in secondary particles on a cross-section, even more preferably 1 to 5, may be formed.

In the present invention, a first dopant including two or more kinds of elements such as Al and Zr is doped during the primary firing, and a second dopant including two or more kinds of elements such as Sr and Ti is doped during the secondary firing such that the crystallite size of an NCM-based positive electrode active material is 170 nm to 300 nm, and in order to allow the average number of primary particles in secondary particles on a cross-section to be 20 or less, the over-firing temperature may be lowered. Accordingly, the positive electrode active material prepared according to the present invention has the crystallite size of the NCM-based positive electrode active material of 170 nm to 300 nm, and furthermore, the average number of primary particles in secondary particles on a cross-section satisfies 20 or less, so that stability is secured such as the decrease in gas generation and suppression of increase in resistance, and problems of the deterioration in capacity and increase in positive electrode active material surface resistance are solved.

<Positive Electrode and Secondary Battery>

According to yet another embodiment of the present invention, a positive electrode for a lithium secondary battery including the positive electrode active material and a lithium secondary battery including the positive electrode are provided.

Specifically, the positive electrode includes a positive electrode current collector and a positive electrode active material layer formed on the positive electrode current collector and including the positive electrode active material.

In the positive electrode, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3-500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

In addition, the positive electrode active material layer may include a conductive material and a binder, together with the positive electrode active material described above.

At this time, the conductive material is used to impart conductivity to an electrode, and any conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. Typically, the conductive material may be included in an amount of 1-30 wt % based on the total weight of the positive electrode active material layer.

In addition, the binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-CO-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1-30 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer including the positive electrode active material described above and optionally, a binder and a conductive material on the positive electrode current collector, followed by drying and roll-pressing. At this time, the type and content of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In another method, the positive electrode may be manufactured by casting a composition for forming a positive electrode active material layer on a separate support and then laminating a film obtained by being peeled off from the support on a positive electrode current collector.

According to yet another embodiment of the present invention, there is provided an electrochemical device including the positive electrode. The electrochemical device may be specifically a battery, a capacitor, or the like, and more specifically, may be a lithium secondary battery.

The lithium secondary battery includes a positive electrode, a negative electrode disposed to face the positive electrode, a separator interposed between the positive electrode and the negative electrode, and an electrolyte, and the positive electrode is the same as described above. In addition, the lithium secondary battery may further include a battery case for accommodating an electrode assembly composed of the positive electrode, the negative electrode, and the separator, and a sealing member for sealing the battery case, optionally.

In the lithium secondary battery, the negative electrode includes a negative electrode current collector and a negative electrode active material layer disposed on the negative electrode current collector.

The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3-500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, a non-woven body, and the like.

The negative electrode active material layer selectively includes a binder and a conductive material in addition to the negative electrode active material. As an example, the negative electrode active material layer may be prepared by applying a composition for forming a negative electrode including a negative electrode active material and selectively a binder and a conductive material on a negative electrode current collector, following by drying. Alternatively, the negative electrode active material layer may be prepared by casting the composition on a separate support, and then laminating a film obtained by being peeling off from the support on a negative electrode current collector.

As the negative electrode active material, a compound capable of reversible intercalation and deintercalation of lithium may be used. Specific examples of the negative electrode active material may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta(0<\beta<2)$, $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those described above in the description of the positive electrode.

Meanwhile, in the lithium secondary battery, the separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Furthermore, a coated separator including a ceramic component or a polymer material may be used to secure heat resistance or mechanical strength, and may be used in a single-layered or a multi-layered structure, selectively.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among the above solvents, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiCAF_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1-2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, in addition to the above components to constitute the electrolyte, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1-5 wt % based on the total weight of the electrolyte.

The lithium secondary battery including the positive electrode active material according to the present invention as describe above stably exhibits excellent discharging capacity, output properties, and capacity retention rate, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

Hereinafter, Examples of the present invention will be described in detail so that those skilled in the art may easily carry out the present invention. The present invention may, however, be embodied in many different forms and is not limited to the examples set forth herein.

EXAMPLE 1

In a batch-type 5 L reactor set at 60° C., $NiSO_4$, $CoSO_4$, and $MnSO_4$ were mixed in water in an amount such that the molar ratio of nickel:cobalt manganese was 60:20:20 to prepare a precursor forming solution having a concentration of 2.4 M.

To a co-precipitation reactor (capacity 5 L), 1 liter of deionized water was added, and nitrogen gas was purged into the reactor at a rate of 2 liters/minute to remove dissolved oxygen in the water and to create a non-oxidizing atmosphere in the reactor. Thereafter, 10 ml of an NaOH aqueous solution having a concentration of 25% was added thereto, followed by stirring at 60° C. at a stirring rate of 1200 rpm while maintaining a pH of 12.0.

Thereafter, the precursor forming solution was added at a rate of 180 ml/hr, and a co-precipitation reaction was performed for 18 hours while adding an NaOH aqueous solution and an $NH_4OH$ aqueous solution to form particles of a nickel-cobalt-manganese-containing hydroxide ($Ni_{0.60}Co_{0.20}Mn_{0.20}(OH)_2$). The hydroxide particles were separated, washed and dried in an oven at 120° C. to prepare a positive electrode active material precursor. The positive electrode active material precursor prepared as described above was in the form of secondary particles in which primary particles were aggregated.

The positive electrode active material precursor prepared as described above and a lithium raw material LiOH were added to a Henschel mixer (700 L) such that the final molar ratio of Li/M (Ni, Co, Mn) was 1.02, and first dopant raw materials $Al(OH)_2$ and $ZrO_2$ were added such that the final content of the total first dopant elements was 3500 ppm, and mixed for 20 minutes at 300 rpm. The mixed powder was placed in an alumina crucible having a size of 330 mm×330 mm, and was subjected to a primary firing at 930° C. for 15 hours under an oxygen ($O_2$) atmosphere.

Thereafter, second dopant raw materials $SrCO_3$ and $TiO_2$ were added to a Henschel mixer (700 L) together with a first calcined product such that the final content of the total second dopant elements was 2000 ppm, and mixed for 20 minutes at 300 rpm in the center. The mixed powder was placed in an alumina crucible having a size of 330 mm×330 mm, and was subjected to a secondary firing at 830° C. for 15 hours under an oxygen ($O_2$) atmosphere to form a lithium composite transition metal oxide. 300 g of the lithium composite transition metal oxide prepared as described above was added to 300 mL of ultra-pure water, stirred for 30 minutes, washed with water, and then filtered for 20 minutes. The filtered lithium composite transition metal oxide was dried in a vacuum oven at 130° C. for 10 hours, followed by sieving to prepare a positive electrode active material.

EXAMPLE 2

In a batch-type 5 L reactor set at 60° C., $NiSO_4$, $CoSO_4$, and $MnSO_4$ were mixed in water in an amount such that the molar ratio of nickel:cobalt manganese was 50:30:20 to prepare a precursor forming solution having a concentration of 2.4 M.

To a co-precipitation reactor (capacity 5 L), 1 liter of deionized water was added, and nitrogen gas was purged into the reactor at a rate of 2 liters/minute to remove dissolved oxygen in the water and to create a non-oxidizing atmosphere in the reactor. Thereafter, 10 ml of an NaOH aqueous solution having a concentration of 25% was added thereto, followed by stirring at 60° C. at a stirring rate of 1200 rpm while maintaining a pH of 12.0.

Thereafter, the precursor forming solution was added at a rate of 180 ml/hr, and a co-precipitation reaction was performed for 18 hours while adding an NaOH aqueous solution and an $NH_4OH$ aqueous solution to form particles of a nickel-cobalt-manganese-containing hydroxide ($Ni_{0.50}Co_{0.30}Mn_{0.20}(OH)_2$). The hydroxide particles were separated, washed and dried in an oven at 120° C. to prepare a positive electrode active material precursor. The positive electrode active material precursor prepared as described above was in the form of secondary particles in which primary particles were aggregated.

The positive electrode active material precursor prepared as described above and a lithium raw material LiOH were added to a Henschel mixer (700 L) such that the final molar ratio of Li/M (Ni, Co, Mn) was 1.02, and first dopant raw materials $Al(OH)_2$ and $ZrO_2$ were added such that the final content of the total first dopant elements was 3500 ppm, and mixed for 20 minutes at 300 rpm. The mixed powder was placed in an alumina crucible having a size of 330 mm×330 mm, and was subjected to a primary firing at 970° C. for 15 hours under an oxygen ($O_2$) atmosphere.

Thereafter, second dopant raw materials $SrCO_3$ and $TiO_2$ were introduced into a Henschel mixer (700 L) together with a first calcined product such that the final content of the total second dopant elements was 2000 ppm, and mixed for 20 minutes at 300 rpm in the center. The mixed powder was placed in an alumina crucible having a size of 330 mm×330 mm, and was subjected to a secondary firing at 870° C. for 15 hours under an oxygen ($O_2$) atmosphere to form a lithium composite transition metal oxide.

The lithium composite transition metal oxide prepared as described above was dried in a vacuum oven at 130° C. for 10 hours, followed by sieving to prepare a positive electrode active material.

EXAMPLE 3

A positive electrode active material was prepared in the same manner as in Example 1 except that $Co(OH)_2$ and MgO were mixed as the first dopant raw materials such that the final content of the total first dopant elements was 5000 ppm and $Nb_2O_5$ and $Y_2O_3$ were mixed as the second dopant raw materials such that the final content of the total second dopant elements was 1500 ppm.

EXAMPLE 4

A positive electrode active material was prepared in the same manner as in Example 2 except that $Co(OH)_2$ and MgO were mixed as the first dopant raw materials such that the final content of the total first dopant elements was 5000 ppm and $Nb_2O_5$ and $Y_2O_3$ were mixed as the second dopant raw materials such that the final content of the total second dopant elements was 1500 ppm.

EXAMPLE 5

A positive electrode active material was prepared in the same manner as in Example 1 except that the primary firing temperature was set at 890° C. and the secondary firing temperature was set at 800° C.

EXAMPLE 6

A positive electrode active material was prepared in the same manner as in Example 2 except that the primary firing temperature was set at 930° C. and the secondary firing temperature was set at 850° C.

COMPARATIVE EXAMPLE 1

A positive electrode active material was prepared in the same manner as in Example 1 except that first dopant raw materials and second dopant raw materials were not mixed.

COMPARATIVE EXAMPLE 2

A positive electrode active material was prepared in the same manner as in Example 2 except that first dopant raw materials and second dopant raw materials were not mixed.

COMPARATIVE EXAMPLE 3

A positive electrode active material was prepared in the same manner as in Example 1 except that $ZrO_2$ was mixed as the first dopant raw material such that the final content of the first dopant element was 3500 ppm and $SrCO_3$ was mixed as the second dopant raw material such that the final content of the second dopant elements was 2000 ppm.

COMPARATIVE EXAMPLE 4

A positive electrode active material was prepared in the same manner as in Example 2 except that $ZrO_2$ was mixed as the first dopant raw material such that the final content of the first dopant element was 3500 ppm and $SrCO_3$ was mixed as the second dopant raw material such that the final content of the second dopant elements was 2000 ppm.

EXPERIMENTAL EXAMPLE 1

Positive Electrode Active Material Specific Surface area And Crystallite Size The specific surface area and crystallite size of the positive electrode active materials prepared in each of Examples 1 to 6 and Comparative Examples 1 to 4 were measured. The specific surface area was measured using a gas adsorption analyzer (BELSORP mini II), the crystallite size was calculated by measuring an XRD (Bruker D4 Endeavor).

TABLE 1

| | Specific surface area ($m^2/g$) | Crystallite size (nm) |
|---|---|---|
| Example 1 | 0.45 | 255 |
| Example 2 | 0.55 | 251 |
| Example 3 | 0.67 | 234 |
| Example 4 | 0.61 | 223 |
| Example 5 | 0.57 | 210 |
| Example 6 | 0.60 | 190 |
| Comparative Example 1 | 0.15 | 312 |
| Comparative Example 2 | 0.21 | 308 |
| Comparative Example 3 | 0.92 | 155 |
| Comparative Example 4 | 0.87 | 167 |

Referring to Table 1 above, the specific surface area of the positive electrode active material prepared in each of Examples 1 to 6 is 0.7 $m^2/g$ or less, which is reduced from that of the positive electrode active material of each of Comparative Examples 3 to 4. In addition, the positive electrode active material of each of Examples 1 to 6 has a crystallite size of 170 nm to 300 nm, which is increased from that of the positive electrode active material of each of Comparative Examples 3 and 4. Meanwhile, in the case of Comparative Examples 1 and 2 in which the first and second dopants were not doped at all, since there was no energy consumption required for the dopant migration when compared with Examples 1 and 2 in which a dopant was present, the driving force of the crystallite growth was increased, so that the crystallite size was greater than 300 nm.

EXPERIMENTAL EXAMPLE 2

Positive Electrode Active Material Observation

The positive electrode active material prepared in each of Examples 1 to 6 and Comparative Examples 1 to 4 was etched into a cross-section using a focused ion beam (FIB) device, and or more secondary particle cross-sections were observed using a scanning electron microscope (FEO-SEM). At this time, the total number of primary particles compared to the total number of secondary particles was calculated as follows to confirm the average number of primary particles in the secondary particles on the cross-section. The results are shown in Table 2 below.

TABLE 2

| | Average number of primary particles in secondary particles on cross section |
|---|---|
| Example 1 | 4.3 |
| Example 2 | 4.9 |
| Example 3 | 11 |
| Example 4 | 14.7 |
| Example 5 | 7.9 |
| Example 6 | 7 |
| Comparative Example 1 | 5.1 |
| Comparative Example 2 | 3.5 |
| Comparative Example 3 | 28.4 |
| Comparative Example 4 | 27 |

Referring to Table 2, the positive electrode active material prepared in each of Examples 1 to 6 of the present invention has an average number of primary particles in the secondary particles on the cross-section of 20 or less, but in the case of Comparative Examples 3 and 4 in which only one kind of dopant element was doped respectively, the average number of primary particles in the secondary particles on the cross-section was greater than 20. The positive electrode active material prepared as in each of Examples 1 to 6, it was confirmed that the average number of primary particles in the secondary particles on the cross-section was 20 or less even though the over-firing temperature was lowered by doping two or more specific first and second dopants during the primary firing and the secondary firing, respectively. Meanwhile, in the case of Comparative Examples 1 and 2 in which the first and second dopants were not doped at all, since there was no factor hindering the growth of primary particles when compared with a case in which a dopant was added, the average number of primary particles in the secondary particles was 20 or less, which was similar to that of Examples 1 and 2.

EXPERIMENTAL EXAMPLE 3

Thermal Stability Evaluation

In order to evaluate the thermal stability of the positive electrode active material prepared in each of Examples 1-2, 5 and Comparative Example 3, heat flow according to the temperature was measured using a differential scanning calorimeter (SETARAM Co, Ltd., SENSYS Evo). Specifically, a lithium secondary battery manufactured using the positive electrode active material of each of Examples 1-2, 5 and Comparative Example 3 as in Preparation Example was decomposed in the state of SOC 100% charge, and a cell for measuring DSC was added with a positive electrode and a new electrolyte to proceed the measurement by raising the temperature from room temperature to 400° C. at a rate of 10° C. per minute. The results are shown in Table 3 below.

TABLE 3

| | DSC main peak (° C.) | Maximum heat flow |
|---|---|---|
| Example 1 | 320 | 1.36 |
| Example 2 | 299 | 1.5 |
| Example 5 | 301 | 1.58 |
| Comparative Example 3 | 288 | 1.71 |

Referring to Table 3, in the case of Examples 1-2, and 5, the main peak at which the heat flow is maximum appeared at a relatively high temperature which was 299° C. or higher, and it can be confirmed that the maximum heat flow was significantly reduced when compared with Comparative Example 3. Through the above, it can be seen that Examples of the present invention had significantly improved thermal stability.

EXPERIMENT EXAMPLE 4

High Temperature Storage Properties Evaluation

The positive electrode active material prepared in each of Examples 1 to 6 and Comparative Examples 1 to 3, a carbon black conductive material, and a PVdF binder were mixed in an N-methylpyrrolidone solvent at a weight ratio of 96:2:2 to prepare a positive electrode mixture material (viscosity: 5000 mPa·s), and the mixture material was applied on one surface of an aluminum current collector, dried at 130° C., and then roll-pressed to manufacture a positive electrode.

Lithium metal was used as a negative electrode.

A porous polyethylene separator was interposed between the positive electrode and the negative electrode which were prepared as described above to prepare an electrode assembly, and then the electrode assembly was placed inside a case. Thereafter, an electrolyte was injected into the case to manufacture a lithium secondary battery. At this time, the electrolyte was prepared by dissolving lithium hexafluorophosphate ($LiPF_6$) of 1.0 M concentration in an organic solvent including ethylene carbonate/ethyl methyl carbonate/diethylene carbonate (mixing volume ratio of $$EC/EMC/DEC = 3/4/3).$$

The lithium secondary battery half cell prepared as described above was charged (end current 1/20 C) until 0.5 C and 4.4 V in CCCV mode. Two positive electrodes charged as described above and two polyethylene separators were alternately laminated on the bottom place of a coin cell. Thereafter, an electrolyte was injected thereto, and the coin cell manufactured by being covered with a gasket was placed into an aluminum pouch and sealed with vacuum. Thereafter, gas generated by storing the coin cell at 60° C. for 2 weeks was measured using a gas chromatograph-mass spectrometer (GC-MS). The results are shown in Table 4 below.

TABLE 4

| | High-temperature storage gas generation (μℓ/g) |
|---|---|
| Example 1 | 1320 |
| Example 2 | 1200 |
| Example 3 | 1580 |
| Example 4 | 1610 |
| Example 5 | 1550 |
| Example 6 | 1480 |
| Comparative Example 1 | 2440 |
| Comparative Example 2 | 2615 |
| Comparative Example 3 | 2430 |
| Comparative Example 4 | 2190 |

Referring to Table 4, the positive electrode active material prepared in each of Examples 1 to 6 had significantly reduced amount of high temperature storage gas generation when compared with the positive electrode active material prepared in each of Comparative Examples 1 to 4. In the case of Comparative Examples 1 and 2 in which the first and second dopant were not doped at all, since there was no dopant serving to stabilize surface and stricture, the amount of gas generated was significantly higher. In the case of Comparative Examples 3 and 4 in which one kind of dopant was doped, since over-firing was not sufficiently performed when compared with Examples 1 to 6, the BET was relatively high, and the amount of gas generated was significantly higher due to the increase in reaction surface area thereby.

EXPERIMENTAL EXAMPLE 5

Evaluation of Room Temperature Resistance Properties

A lithium secondary battery prepared as in Experiment Example 4 using the positive electrode active material of each of Examples 1 to 6 and Comparative Examples 1 to 4 was subjected to constant current discharge at 25° C. and SOC 10% for 10 seconds with 1.0 C, and using a measured voltage drop, the resistance was calculated and compared. The results are shown in Table 5 below.

TABLE 5

| | 25° C. resistance (Ω) |
|---|---|
| Example 1 | 22.4 |
| Example 2 | 23 |
| Example 3 | 26.6 |
| Example 4 | 24.1 |
| Example 5 | 20.5 |
| Example 6 | 21 |
| Comparative Example 1 | 45.7 |
| Comparative Example 2 | 48.5 |
| Comparative Example 3 | 25.8 |
| Comparative Example 4 | 27.2 |

Referring to Table 5, Examples of 1 to 6 of the present invention had improved room temperature resistance when compared with Comparative Examples 1 to 4. Particularly, when compared with Comparative Examples 1 to 2 in which the first and second dopant were not doped at all, Examples 1 to 6 had significantly improved room temperature resistance properties, which may be due to the fact that Comparative Examples 1 and 2 could not have a lithium ion diffusion resistance improvement effect from the addition of dopant.

The invention claimed is:

1. A positive electrode active material for a secondary battery, the material being a lithium composite transition metal oxide including nickel (Ni), cobalt (Co), and manganese (Mn), wherein the lithium composite transition metal oxide includes two or more kinds of first dopants selected from the group consisting of Zr, Al, V, Co, and Mg and two or more kinds of second dopants selected from the group consisting of Ti, Y, Sr, Nb, Ba, and Ca, wherein the first dopants are contained in the total content of 2,000 ppm to 6,000 ppm, and the second dopants are contained in the total content of 500 ppm to 3,000 ppm.

2. The positive electrode active material of claim 1, wherein an average number of primary particles in secondary particles on a cross-section is 20 or less, wherein the average number is calculated by etching the particles of the lithium composite transition metal oxide into the cross-section using a focused ion beam (FIB) device, and calculating the average number when 20 or more secondary particle cross-sections are observed using a scanning electron microscope (FE-SEM).

3. The positive electrode active material of claim 1, wherein particles of the lithium composite transition metal oxide has a crystallite size of 170 nm to 300 nm.

4. The positive electrode active material of claim 1, wherein the particles of the lithium composite transition metal oxide have a specific surface area of 0.2 $m^2/g$ to 0.7 $m^2/g$.

5. The positive electrode active material of claim 2, wherein the particles of the lithium composite transition metal oxide have an average number of primary particles in secondary particles on a cross-section of 10 or less.

6. The positive electrode active material of claim 1, wherein the lithium composite transition metal oxide has a nickel (Ni) content of 60 mol % or greater in a total content of metals excluding Li (lithium).

7. The positive electrode active material of claim 1, wherein the lithium composite transition metal oxide has a nickel (Ni) content of less than 60 mol % in the total content of metals excluding Li (lithium).

8. A method for preparing a positive electrode active material for a secondary battery, the method comprising:

mixing a positive electrode active material precursor including nickel (Ni), cobalt (Co), and manganese (Mn), a lithium raw material, and at least two kinds of first dopant raw materials selected from the group consisting of Zr, Al, V, Co, and Mg, and subjecting the mixture to primary firing; and after the primary firing, mixing at least two kinds of second dopant raw materials selected from the group consisting of Ti, Y, Sr, Nb, Ba, and Ca, and subjecting the mixture to secondary firing, wherein the first dopant raw materials are mixed such that a total content of the first dopants based on the total weight of the positive electrode active material is 2,000 ppm to 6,000 ppm and the second dopant raw materials are mixed such that a total content of the second dopants based on the total weight of the positive electrode active material is 500 ppm to 3,000 ppm.

9. The method of claim 8, wherein when the positive electrode active material precursor has a nickel (Ni) content of 60 mol % or greater in a total content of metals, the primary firing is performed at 800° C. to 1,000° C.

10. The method of claim 8, wherein when the positive electrode active material precursor has a nickel (Ni) content of less than 60 mol % in the total content of metals, the primary firing is performed at 900° C. to 1,100° C.

11. The method of claim 8, wherein when the positive electrode active material precursor has a nickel (Ni) content of 60 mol % or greater in the total content of metals, the secondary firing is performed at 600° C. to 950° C.

12. The method of claim 8, wherein when the positive electrode active material precursor has a nickel (Ni) content of less than 60 mol % in the total content of metals, the secondary firing is performed at 700° C. to 1,050° C.

13. The method of claim 8, wherein an average number of primary particles in secondary particles on a cross-section is 20 or less, wherein the average number is calculated by etching the particles of the lithium composite transition metal oxide formed through the primary firing and the secondary firing into the cross-section using a focused ion beam (FIB) device, and when 20 or more secondary particle cross-sections are observed using a scanning electron microscope (FE-SEM), calculating the average number of primary particles in the secondary particles on the cross-section.

14. A positive electrode comprising the positive electrode active material according to claim 1.

15. A lithium secondary battery comprising the positive electrode according claim 14.

* * * * *